United States Patent [19]
Neugebauer

[11] 3,810,390
[45] May 14, 1974

[54] MINIATURE PRESSURE GAUGE

[75] Inventor: Gerhard Neugebauer, Trennfurt, Germany

[73] Assignee: Alexander Wiegand Armaturen-und Manometerfabrik, Main, Germany

[22] Filed: Feb. 23, 1973

[21] Appl. No.: 335,338

[30] Foreign Application Priority Data
Feb. 25, 1972 Germany .................... 7207148

[52] U.S. Cl. .................... 73/418, 116/129 R
[51] Int. Cl. .................... G01l 7/04
[58] Field of Search ........... 73/418, 411, 412–417, 73/431; 116/129 R

[56] References Cited
UNITED STATES PATENTS
3,641,820  2/1972  Bissell .................... 73/418
3,730,000  5/1973  Waite .................... 73/418

Primary Examiner—Donald O. Woodiel
Attorney, Agent, or Firm—Leonard H. King

[57] ABSTRACT

A miniature pressure gauge comprised of a housing with connecting sockets and with a spiral spring communicating with the inlet bore thereof. At the free end of the spring a pointer is arranged that is superimposed over a dial.

5 Claims, 3 Drawing Figures

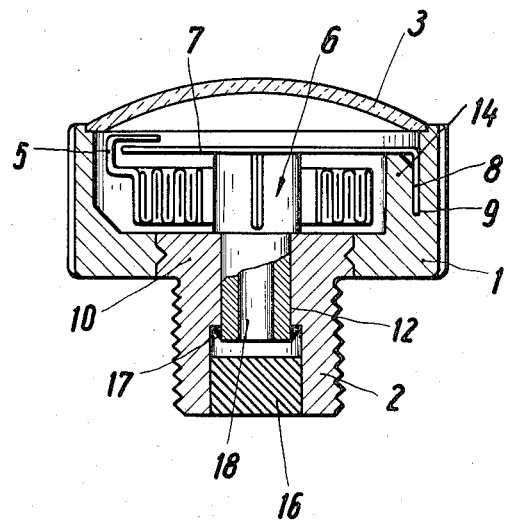
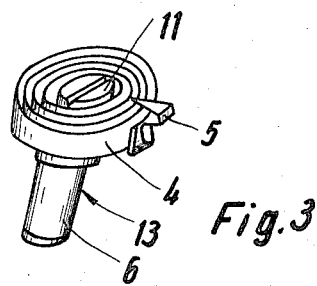
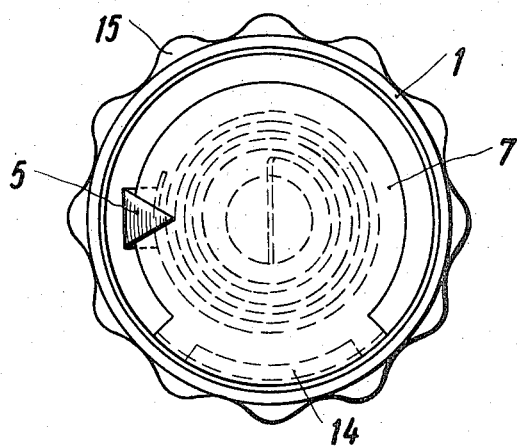

MINIATURE PRESSURE GAUGE

The aforementioned Abstract is neither intended to define the invention of the application which, of course, is measured by the claims nor is it intended to be limiting as to the scope of the invention in any way.

This invention relates generally to gauging instruments and more particularly to miniature pressure gauges that are, for instance, used for attachment to fire extinguishers.

Miniature pressure gauges of the cited type are known wherein spiral and leaf springs are used as gauging members. The advantage of a spiral spring is that a transmitting system, whatever type it may be, is eliminated. Instead a thin metal strip is arranged as a pointer at the free end of the spring end. The tip of the metal strip moves almost arcuately at the edge of the dial with the respective pressure thereby being indicated on the dial. In this embodiment an indication is permitted over an indicating range up to 270°.

Conventionally, such pressure gauges have been made either with metal sheet or solid metallic housings that are formed directly as a spring carrier with connecting threads. In the case of a sheet metal housing appropriate spring carrier means is required. The assembly of the spring carrier or the soldering of the spring to the inside of the housing causes difficulties in manufacturing. In both embodiments the dial is riveted to the spring carrier above the soldering point of the spring. Readjusting thereby is rendered difficult.

SUMMARY OF THE INVENTION

The present invention is directed towards providing a miniature pressure gauge in which the above-mentioned disadvantages are avoided and which, additionally, can be made simpler and smaller than conventional gauges.

The problems of the prior art are solved by the present invention wherein a miniature pressure gauge is provided with a spiral spring that is formed with its spring carrier as a prefabricated part. The spring and its carrier are insertable in the housing base which is provided with connecting sockets that are encapsulated by the plastic of the housing. The dial is arranged to be rotatable about the center of the housing and insertable in a lateral wall slot of the housing by means of an insert lug.

As a result of the novel configuration of the present invention, the spring may be manufactured with its pointer and the spring carrier as a prefabricated part completely independent of the gauge housing and the connecting sockets thereof, by means of which the gauge is connected to the pressure area to be gauged. Thus, the spring carrier may be inserted as a self-contained unit in the gauge housing and be retained therein by means of an adhesive that is provided for sealing the spring carrier in relationship to the connecting sockets. As a result of the fact that the housing of this invention is made of a plastic, there is the advantage of a rivetless attachment of the dial and for simpler adjusting, which will be described in greater detail hereinafter.

For the sake of a trouble-free adhesion of the insert lug of the spring carrier, the pressure gauge is furthermore formed in such a way that in the housing an insert hole is provided that is shorter in its length than the insert lug of the spring carrier. Thus it can be assured that, when bonding, no sealing can occur of the fine bore which leads to the spiral spring.

In order to be able to provide the insert slot for the indicator dial, a slight wall reinforcement of the housing is provided in the inserting area. This can be made readily since the housing is made of plastic. Housings of plastic are admittedly already known, but not in connection with miniature pressure gauges and also not in the limitation to the side wall alone. An inherent advantage thereof is that, on the one hand, a sight disc consisting of plastic may be bonded to the housing wall, for instance by ultra-sonic welding; on the other hand, the external side wall of the housing may be provided in a simple way with coarse serrations or knurls permitting the assembly of the pressure gauge with a special type wrench especially adapted for that purpose. In contradistinction, with metal housings the outer wall had to be provided with a relatively thick section in order to be able to machine engaging surfaces for a key wrench and this contributed, at least in part, to the high cost of such conventional pressure gauges.

The novel pressure gauge comprising the present invention hereinafter is explained by reference to the drawing which is an illustration of one embodiment.

BRIEF DESCRIPTION OF THE DRAWING

In the various figures of the drawing, like reference characters designate like parts.

In the drawing:

FIG. 1 is a longitudinal sectional view of the pressure gauge of this invention on an enlarged scale;

FIG. 2 is a top plan view of the pressure gauge, as shown in FIG. 1; and

FIG. 3 is a perspective illustration of the spiral spring with the pointer and the spring carrier as a unit ready for insertion.

DESCRIPTION OF THE PREFERRED EMBODIMENT

In FIG. 1 of the drawing, reference character 1 designates a housing made of plastic, in which a metallic housing base 10 having a connecting socket 2 is encapsulated by molding. There is provided a sight disc 3 made of transparent plastic and a spiral spring carrying a pointer 5. Reference character 6 designates an insert lug of a spring carrier 13 having a surface 11 which is engaged in a conventional way by an indicator dial 7 after the insertion of the arcuate tab 9 thereof in a slot 8 of the wall reinforcement 14. The engagement of the dial 7 is permitted to be effected with a certain spring bias because the tab 9 is bent at an angle that is a little smaller than 90° with respect to the dial 7.

The length of the insert lug 6 of the spring carrier 13 is dimensioned a little larger than that of an insert hole 12 in the connecting socket 2 of the housing base 10. As will be noted from FIG. 1, an annular space 17 thereby results in which adhesive may collect after it is expelled during the insertion operation, so that it cannot clog the bore 18.

At the lower end the main bore of the connecting socket 2 is closed by a metallic and gas-permeable sintered mass 16 in cases where such a pressure gauge is attached, for instance, to fire extinguishers. This construction prevents the extinguishing powder from clogging or plugging the spring carrier 13 and the spring 4. On the outside surface the side wall of the housing 1 is provided with a coarse knurl.

Since the indicator dial is merely inserted in the housing wall with its tab 9, there advantageously is the possibility of angularly adjusting even such a small pressure gauge by shifting the dial 7 over whatever small arc is necessary.

It is possible as a result of the configuration of the pressure gauge comprising the present invention to manufacture it in sizes of the order of about 15 to 20 mm in diameter and of about 12 mm in height (disregarding the connecting socket).

There has been disclosed heretofore the best embodiment of the invention presently contemplated. However, it is to be understood that various changes and modifications may be made by those skilled in the art without departing from the spirit of the invention.

What I claim as new and desire to secure by Letters Patent is:

1. A miniature pressure gauge comprising:
   a. a generally cup-shaped plastic housing having an axially extending slot in the wall thereof;
   b. a metallic base member including a connecting socket coupled to said housing, said socket having a bore therethrough;
   c. a subassembly comprising:
      1. a spring carrier positioned in said bore of said base member;
      2. a spiral spring secured to said spring carrier; and
      3. a pointer secured to said spring; and
   d. an angularly adjustable dial plate including a bent tab positioned in the slot of said housing wall, said dial plate being positioned below said pointer.

2. The pressure gauge in accordance with claim 1 wherein a first portion of the bore in said base member is shorter in length than the portion of the spring carrier positioned therein.

3. The pressure gauge in accordance with claim 1 wherein the portion of the housing wall in the vicinity of the axially extending slot is thicker than the remaining portion of the housing wall.

4. The pressure gauge in accordance with claim 1 wherein the outside surface of the housing wall is knurled.

5. The pressure gauge in accordance with claim 1 wherein the axially extending slot in said housing and said tab on said dial plate are both arcuate.

* * * * *